United States Patent [19]
Yasukohchi et al.

[11] Patent Number: 5,745,445
[45] Date of Patent: Apr. 28, 1998

[54] DIGITAL RECORDING AND REPRODUCING APPARATUS AND METHOD WHICH PREVENTS OR MANAGES A DATA LOSS

[75] Inventors: Ryuji Yasukohchi; Akio Uesugi; Masaki Sato, all of Tokyo; Hiroshi Nishikawa, Kawasaki, all of Japan

[73] Assignee: Matsushita Electric Industrial Co., Ltd., Osaka, Japan

[21] Appl. No.: 758,533

[22] Filed: Nov. 29, 1996

[30] Foreign Application Priority Data

Dec. 1, 1995 [JP] Japan ............... 7-314137

[51] Int. Cl.⁶ .................................. G11B 7/00
[52] U.S. Cl. ............... 369/32; 369/60; 369/53
[58] Field of Search ............... 369/60, 59, 32, 369/56, 44.28, 124, 53

[56] References Cited

U.S. PATENT DOCUMENTS

| | | | |
|---|---|---|---|
| 4,604,687 | 8/1986 | Abbott | 364/200 |
| 5,235,575 | 8/1993 | Han | 369/60 |
| 5,291,468 | 3/1994 | Carmon et al. | 369/60 |
| 5,432,769 | 7/1995 | Honjo | 369/60 |
| 5,436,703 | 7/1995 | Tsuji et al. | 369/60 |
| 5,491,677 | 2/1996 | Saski | 369/60 |
| 5,502,703 | 3/1996 | Yamada et al. | 369/60 |
| 5,596,560 | 1/1997 | Ishii | 369/60 |
| 5,608,698 | 3/1997 | Yamanoi et al. | 369/60 |

FOREIGN PATENT DOCUMENTS

5-37889  2/1993  Japan.

*Primary Examiner*—Nabil Hindi
*Attorney, Agent, or Firm*—Lowe, Price, LeBlanc & Becker

[57] ABSTRACT

A recording and reproducing apparatus and method which prevents or manages a data loss caused by each of seek operations in recording/reproducing a time-series digital data set, to/from a disk recording media via a buffer. Before recording/reproducing, a check is made, by using a rate of data transfer with the outside, of a data transfer rate in an access to a track where each of the selected sectors lies, and of a seek time for each of changes in tracks, to see if the buffer will overflow/underflow during the period of recording/reproducing. If so, then an input/output data transfer rate is reduced before recording/reproducing to make the check. In case of recording, if there is at least a substitute for a sector which will cause the overflow, the sector is changed to a substitute.

18 Claims, 9 Drawing Sheets

ACCESS DATA TABLE

| TRACK NO. | WRITE DATA TRANSFER RATE WD (BYTES/SEC) | READ DATA TRANSFER RATE RD (BYTES/SEC) | SEEK TIME (ms) |
|---|---|---|---|

FIG. 7

RESOURCE TABLE

| TRACK NO. | SECTOR AVAILABILITY (H) |
|---|---|
| 0 | 00 |
| 1 | E3 |
| ⋮ | ⋮ |
| N | FF |

FIG. 8

DATA SET TABLE

| TRACK NO. | SECTOR LIST |
|---|---|

DIGITAL RECORDING AND REPRODUCING APPARATUS AND METHOD WHICH PREVENTS OR MANAGES A DATA LOSS

BACKGROUND OF THE INVENTION

1. Field of the Invention

The present invention relates to an apparatus and method for recording and reproducing time-series digital data such as video data, audio data, etc. and, more particularly, to such an apparatus and method capable of preventing or managing a data loss caused by a seek involved in writing and reading a disk recording media.

2. Description of the Prior Art

A recording and reproducing apparatus for storing digital data on a disk recording media is usually provided with a buffer to absorb the difference between a data input rate and a data writing rate and the difference between a data reading rate and a data output rate. However, the tendency of data to be written to and read from separate or scattered areas of the recording media advances in the course of use of the apparatus.

Thus, if data is to be recorded in sectors scattered on a plurality of tracks, each of seek actions will interrupt writing operation, which, depending on the data input rate, may result in a overflow in the buffer, that is, a loss in written data. If data recorded in sectors on a plurality of tracks is to be reproduced, then each of seek actions will interrupt reading operation, which, depending on the data output rate, may result in an underflow in the buffer, that is, a loss in read or reproduced data.

SUMMARY OF THE INVENTION

The above and other problems of the prior known digital recording and reproducing apparatus are overcome, in accordance with an aspect of the invention, by preventing a data loss caused by each of seek operations in a series of accesses, concerning a time-series digital data set, to a disk recording media (recording or reproducing a data set to or from a disk recording media) via a buffer.

In one aspect of the invention, it is determined, prior to a series of accesses, whether the amount of data in the buffer will fall off from the capacity of the buffer during the period of the series of accesses, that is, the buffer will overflow or underflow during the period. If so, then a rate of data transfer with the outside (input/output data transfer rate) is reduced prior to the series of accesses and these procedure is repeated till it is determined that the amount of data in the buffer will remain within the capacity throughout the period.

More specifically, if the series of accesses is a write of the data set to the disk recording media, sectors to record the data set in during the period of the write of the data set are selected in response to the occupancy of the sectors on the disk recording media. The amount of data in the buffer for each time of changes in the mode of access to the buffer during the period of the write is calculated by using an input data transfer rate, a write data transfer rate of a track where each of the selected sectors lies, and a seek time for each of changes in tracks to write in. It is determined whether the amount of data in the buffer for each time of the changes in the mode falls within the capacity of the buffer.

If it is determined that the amount of the buffer data will fall off from the capacity, then prior to changing the rate of data transfer with the outside, a check is made to see if there is at least a substitute for a sector which will cause the amount of buffer data to fall off from the capacity. If so, the sector is changed for one of the substitutes, and the amount of buffer data is calculated again. Otherwise, a rate of input data transfer to the buffer is reduced.

In the course of the selection of sectors, a table of track numbers and sector numbers in which the data set is stored is made.

In case of a read of the data set from the disk recording media, if it is determined, prior to a series of reading access to the disk recording media, that the amount of data in the buffer will fall off from the capacity of the buffer, then a rate of output data transfer from the buffer is reduced.

According to another aspect of the invention, it is determined, in the course of a read of the data set, whether a read operation of the next data to read can be completed before a reproduction of the next data is started. If not, then giving up the read operation for the next data, it is determined whether a read operation of the data to read following the given-up read operation can be completed before a reproduction of the data is started.

BRIEF DESCRIPTION OF THE DRAWINGS

Further objects and advantages of the present invention will be apparent from the following description of the preferred embodiments of the invention as illustrated in the accompanying drawings. In the drawings.

DETAILED DESCRIPTION OF THE PREFERRED EMBODIMENTS

Figure 1:
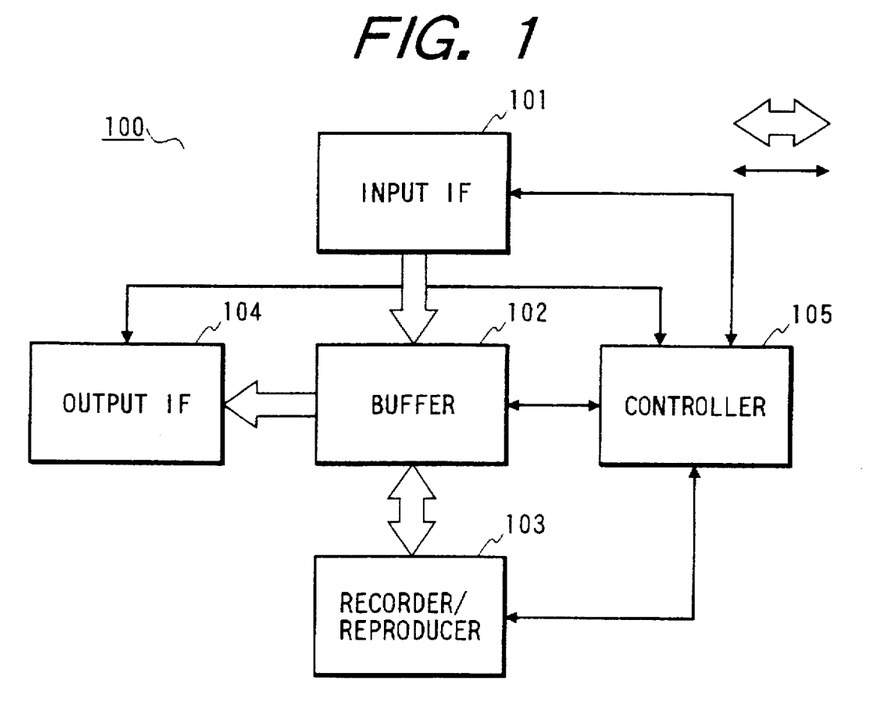
FIG. 1 is a schematic block diagram showing an arrangement of an illustrative embodiment of a recording and reproducing apparatus according to an aspect of the invention.

FIG. 1 is a schematic block diagram showing an arrangement of an illustrative embodiment of a recording and reproducing apparatus with a disk recording media according to an aspect of the invention. In FIG. 1, the recording and reproducing apparatus 100 comprises an input interface (IF) 101 for receiving time-series data to be recorded from an external apparatus (not shown), a recorder/reproducer 103 including a disk recording media (not shown) for recording and reproducing data to and from the disk recording media, an output interface (IF) 104 for outputting reproduced time-series data to an external apparatus (not shown), a buffer for absorbing the difference between the input data transfer rate (transfer rate from the input IF 101 to the buffer 102) and the writing data transfer rate (transfer rate from the buffer 102 to the recorder/reproducer 103), for absorbing the difference between the output data transfer rate (transfer rate from the buffer 102 to the output IF 104) and the reading data transfer rate (transfer rate from the recorder/reproducer 103 to the buffer 102), and for absorbing an interruption, caused by a seek operation, of data transfer between the buffer 102 and the recorder/reproducer 103. The apparatus 100 further comprises a controller 105 for controlling the other elements 101 through 104.

Figure 2:
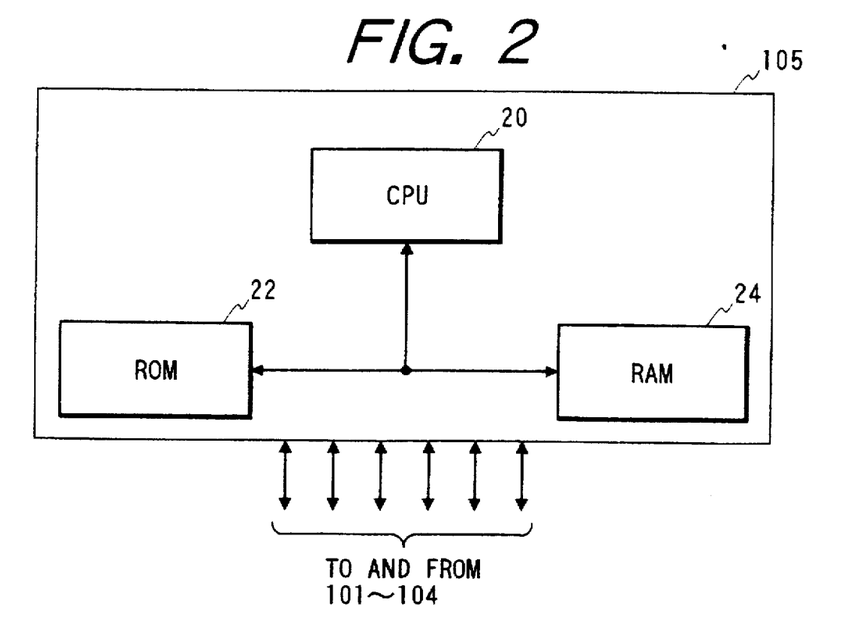
FIG. 2 is a schematic block diagram showing an exemplary arrangement of the controller of FIG. 1.

FIG. 2 is a schematic block diagram showing an exemplary arrangement of the controller 105. The controller 105 comprises a central processing unit (CPU) 20, a read only memory (ROM) 22 for storing a program for controlling operation of the CPU 20, and a random access memory (RAM) 24 for temporary storing data used in operation of CPU 20.

Figure 3:
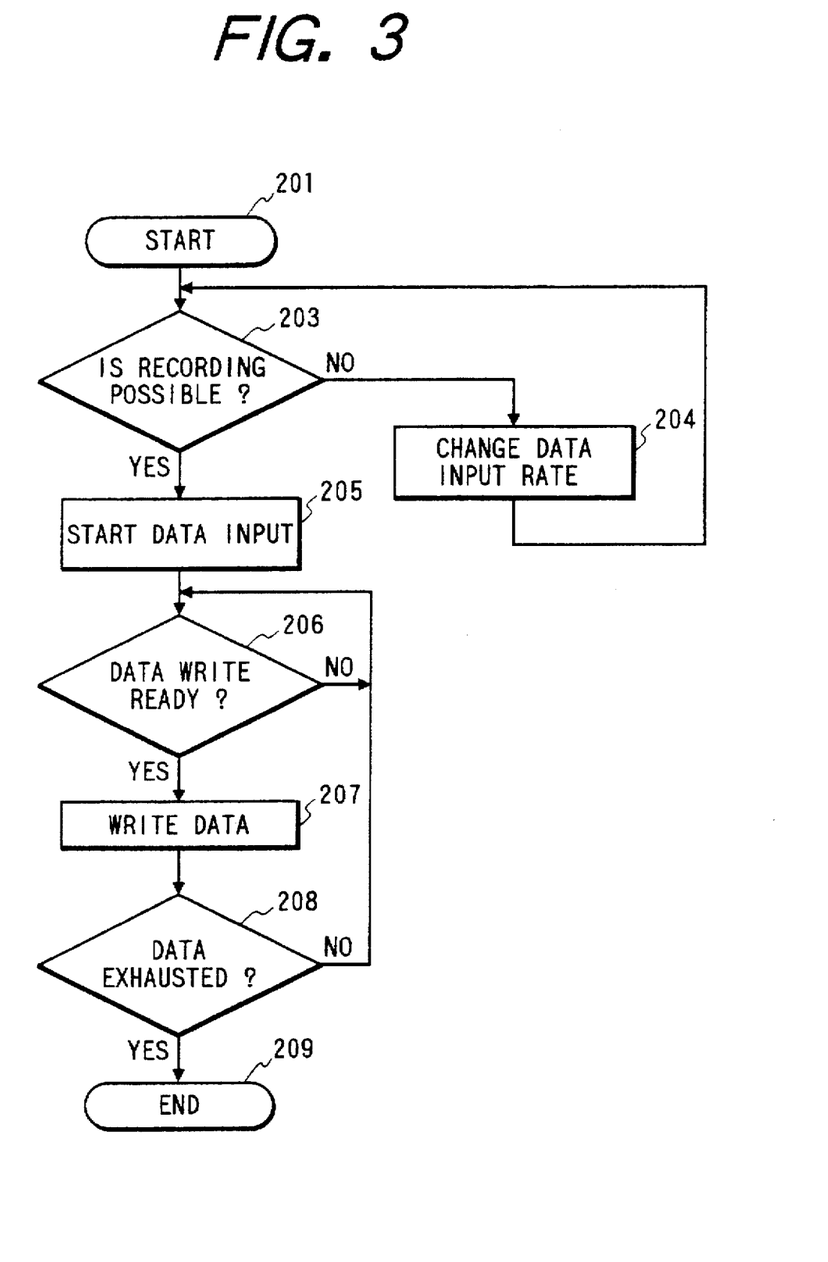
FIG. 3 is a flow chart of recording procedures executed by the controller under the control of a program stored in ROM in FIG. 2.

FIG. 3 is a flow chart of recording procedures executed by the controller 105 under the control of a program stored in ROM 22. In FIG. 3, if the recording and reproducing apparatus 100 is instructed by a user to achieve a recording, then the CPU 20 enters flow of procedures from step 201 to proceeds to 203, where the CPU 20 determines if the recording is will be completed at a predetermined input transfer rate without causing the buffer 102 to overflow.

Figure 4:
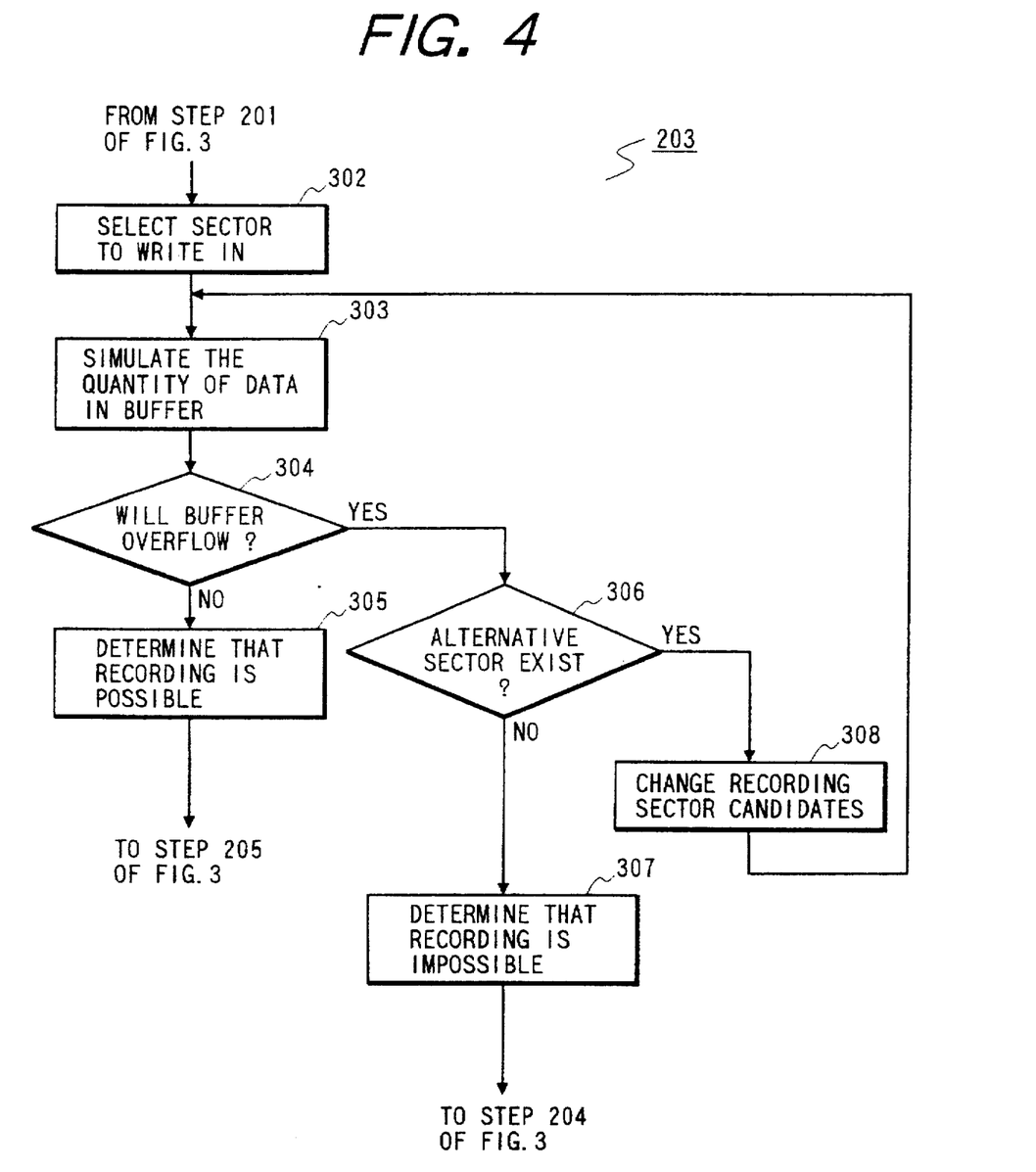
FIG. 4 is a flow chart showing the details of step 203 of FIG. 3.

FIG. 4 is a flow chart showing the details of step 203 in FIG. 3. In step 302, the CPU 20 selects sectors available for recording the time-series data according to the occupancy of the sectors on the disk recording media (not shown). One way of selecting sectors in steps 302 (and 308 as described later) is to select a shortest unrecorded area first. Another way is to first select a sector the access rate of which is as low as possible.

Figure 7:
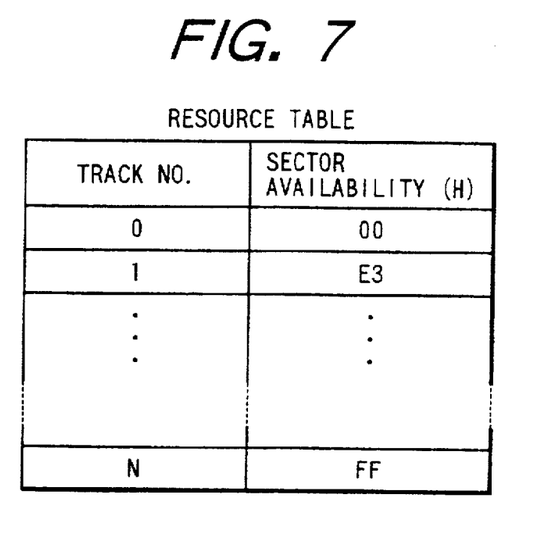
FIG. 7 is a diagram showing an exemplary data structure of a resource table for use in selection of tracks and sectors in which the data set is recorded.

In order to facilitate the knowing of available or unrecorded sectors in each track in step 302, it is preferable to prepare a resource table 10 each record of which contains one of the track numbers and flag data indicative of the availability or occupancy of the sectors on the corresponding track as shown in FIG. 7. In other words, while selecting sectors for recording the data set with reference to the resource table 10 in step 302, the flags corresponding to the selected sectors has to be so set as to indicate the occupancy in the resource table 10.

In step 303, the CPU 20 simulates the amount of data in the buffer 102 throughout the period of the recording by using the transfer rate of the input data from the input IF 101, a writing data transfer rate (transfer rate from the buffer 101 to the recorder/reproducer 103) associated with each of the tracks on which the selected sectors lies, and a period of each seek caused by changing tracks.

Figure 8:
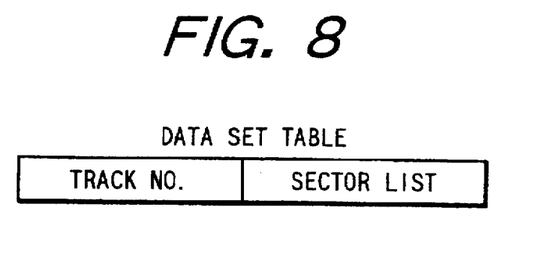
FIG. 8 is a diagram showing an exemplary data structure of a data set table for use in a calculation of the buffer data quantity.

In order to facilitate, in step 303, the knowing of the tracks of the disk recording media and the sectors in which each of the data set has been recorded, it is preferable to prepare for each data set a data set table each record of which contains a track number and a sector list of sectors on the track identified by the track number which are used for recording the data set, as shown in FIG. 8. In other words, while selecting sectors for recording the data set with reference to the resource table 10 in step 302, the data set table for the data set has to be formed.

Figure 6:
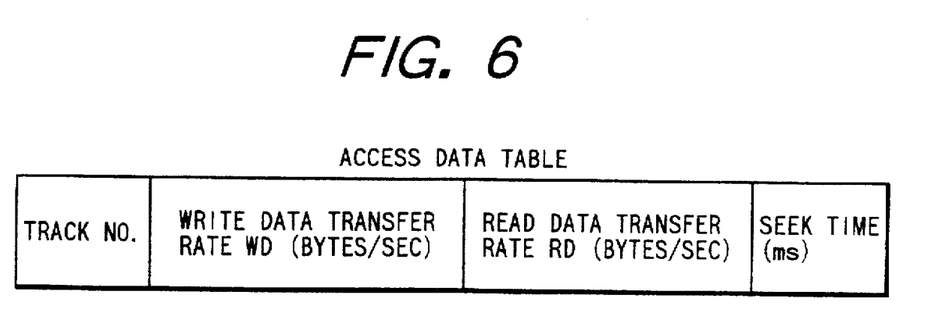
FIG. 6 is a diagram showing an exemplary data structure of an access data table for use in a calculation of the buffer data quantity.

Also, the calculation of the buffer data quantity in step 303 is done with reference to an access data table as shown in FIG. 6. The access data table stores a track number, a write data transfer rate WD for the track identified by the track No., a read data transfer rate RD for the track, and a seek time which it takes to seek a track which is apart from the current track by the number of tracks equal to the track No. This access data table is advantageously provided by the manufacturer of the digital recording and reproducing apparatus.

Figure 5:
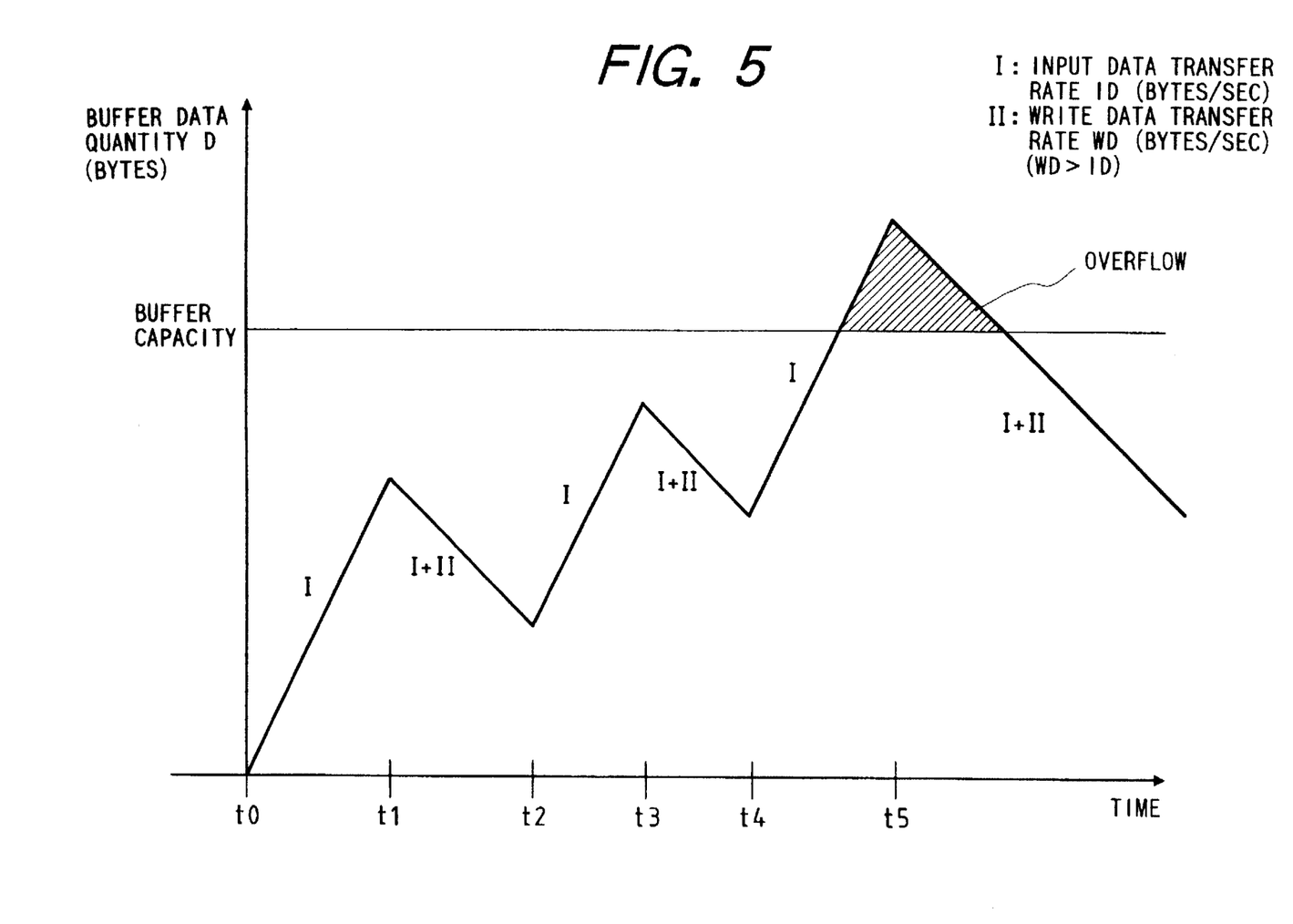
FIG. 5 is a graph showing exemplary time-variations in the buffer data quantity in recording operation.

FIG. 5 is a graph showing exemplary changes in the buffer data quantity in recording operation. In FIG. 5, it is assumed that an input data transfer rate ID is constant through the recording period, and the data transfer from the buffer to the recorder/reproducer 103 is interrupted at each seek time. In periods of t0 through t1, t2 through t3, and t4 through t5, the buffer data quantity D is increasing because the buffer 102 has only the input data transferred thereto but has no recording data transferred therefrom due to an occurrence of seek on the disk recording media. In periods of t1 through t2 and t3 through t4, both of the input data transfer from the input IF 101 to the buffer 102 and the output data transfer from the buffer 102 to the disk recording media is being executed, which results in decreases in the buffer data quantity D due to the writing data transfer rate WD being higher than the input data transfer rate ID. In a period of t4 through t5, the buffer 102 is overflowing.

In this case, it is determined, in step 304, that the recording of the data set is impossible with the sectors which have been selected in step 302, and the control is passed to step 306, where another test is made to see if there are any substitutes for one or more sectors which will cause the buffer 102 to overflow. If any, the CPU 20 changes the one or more sectors for new one(s) in step 308 and returns to step 303.

If no substitute was found in step 306, the CPU 20 proceeds to step 307 to determine that the recording of the data set is impossible with the sectors which have been selected in step 302 or 308, and proceeds to step 204 in FIG. 3. In step 204, the CPU 20 causes the input data transfer rate ID to lower, and returns to step 203 to make a test to see if the recording of the data set is possible at a newly set input data transfer rate ID.

If it is found, in step 304, that the buffer 102 never overflows throughout the period of the recording of the data set, then the CPU 20, in step 305, determines that the recording of the data set is possible with the selected sectors which have been selected in step 302 or 308, and proceeds to step 205 in FIG. 3.

If the CPU 20 could successfully find any condition which enables the recording of the data set as described above, then it begins transferring the data set from the input IF 101 to the buffer 102 in step 205. In step 206, the CPU 20 determines if the data stored in the buffer 102 can be transferred to the recorder/reproducer 103. If not, step 206 is repeated till the result of decision step 206 becomes affirmative. If the result is affirmative in decision step 206, the CPU 20 effects a data transfer from the buffer 102 to the recorder/reproducer 103 in step 207. Then, the CPU 20 makes a test in step 208 to see if the whole data set has been transmitted. If so, the CPU 20 ends its operation at step 209 and, otherwise, returns to step 206 to repeat a data write.

Referring now to FIGS. 9 through 12, we will discuss how a data set is reproduced according to the principles of the invention in the following.

Figure 9:
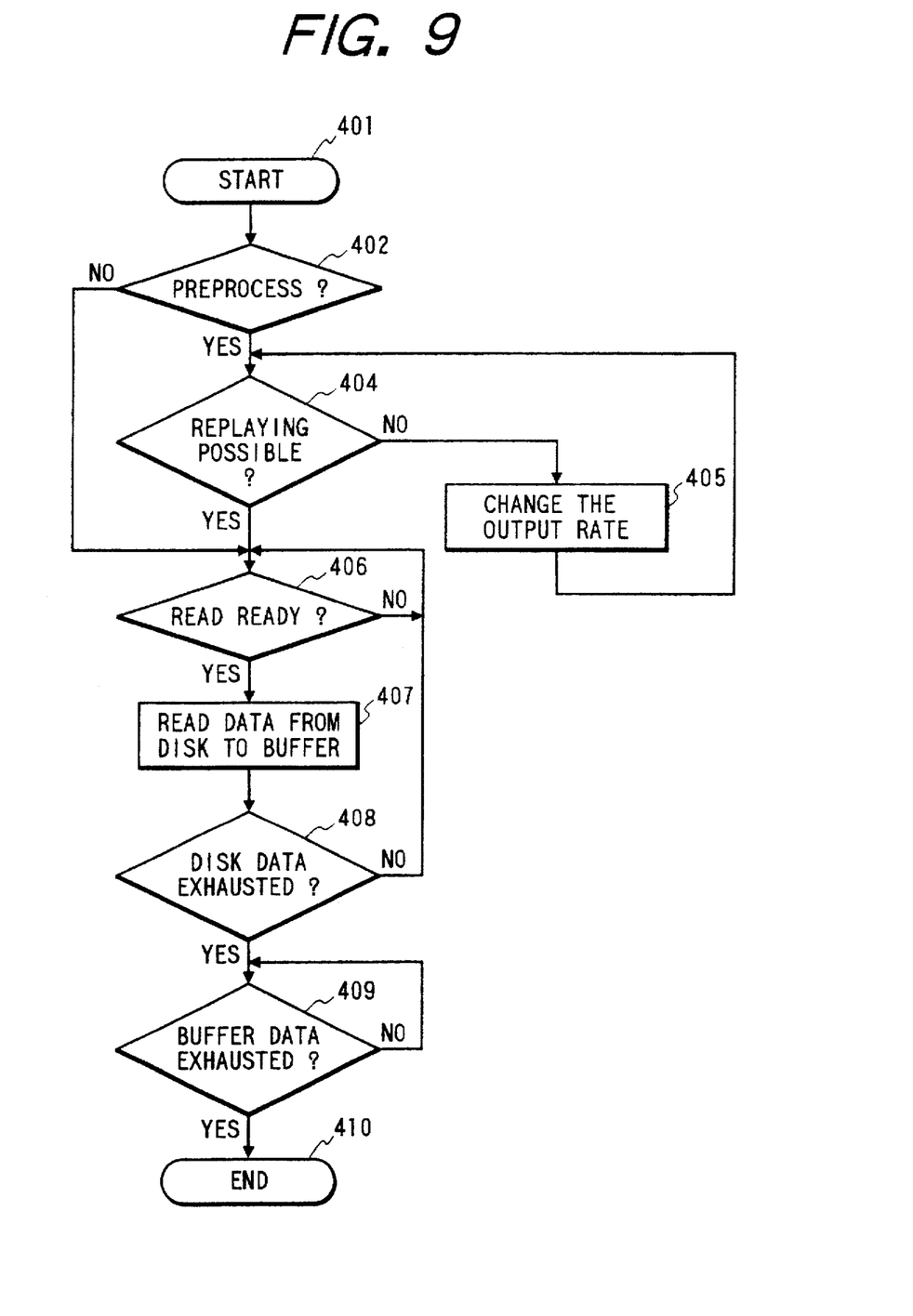
FIG. 9 a flow chart of reproducing procedures executed by the controller.

FIG. 9 shows a flow of reproducing procedures executed by the controller 105. If reproducing of a data set is specified by the user, the CPU 20 enters the flow of reproducing procedures from step 401 and proceeds to step 402, where it is determined if a preprocess is to be executed. If not, then the control is passed to step 406. If the preprocess is to be executed, then the control is passed to step 404, that is, step 502 in FIG. 10.

Figure 10:
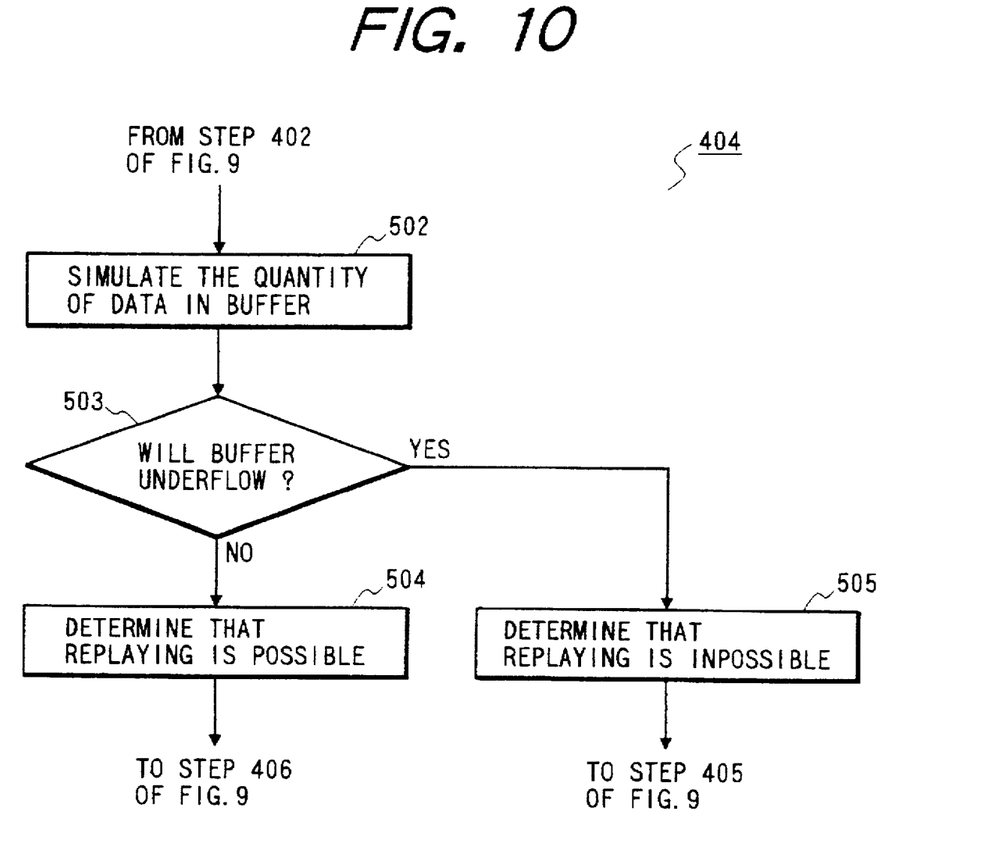
FIG. 10 is a flow chart showing the details of step 404 of FIG. 9.

FIG. 10 is a flow chart showing the details of step 404 of FIG. 9. In step 502, like in a recording, the CPU 20 simulates the buffer 102 data quantity D by using an output data transfer rate OD, a read data transfer rate RD associated with each of the sectors in which data to be reproduced is recorded, and a seek time of each seek caused when sectors on different tracks are read successively.

Figure 11:
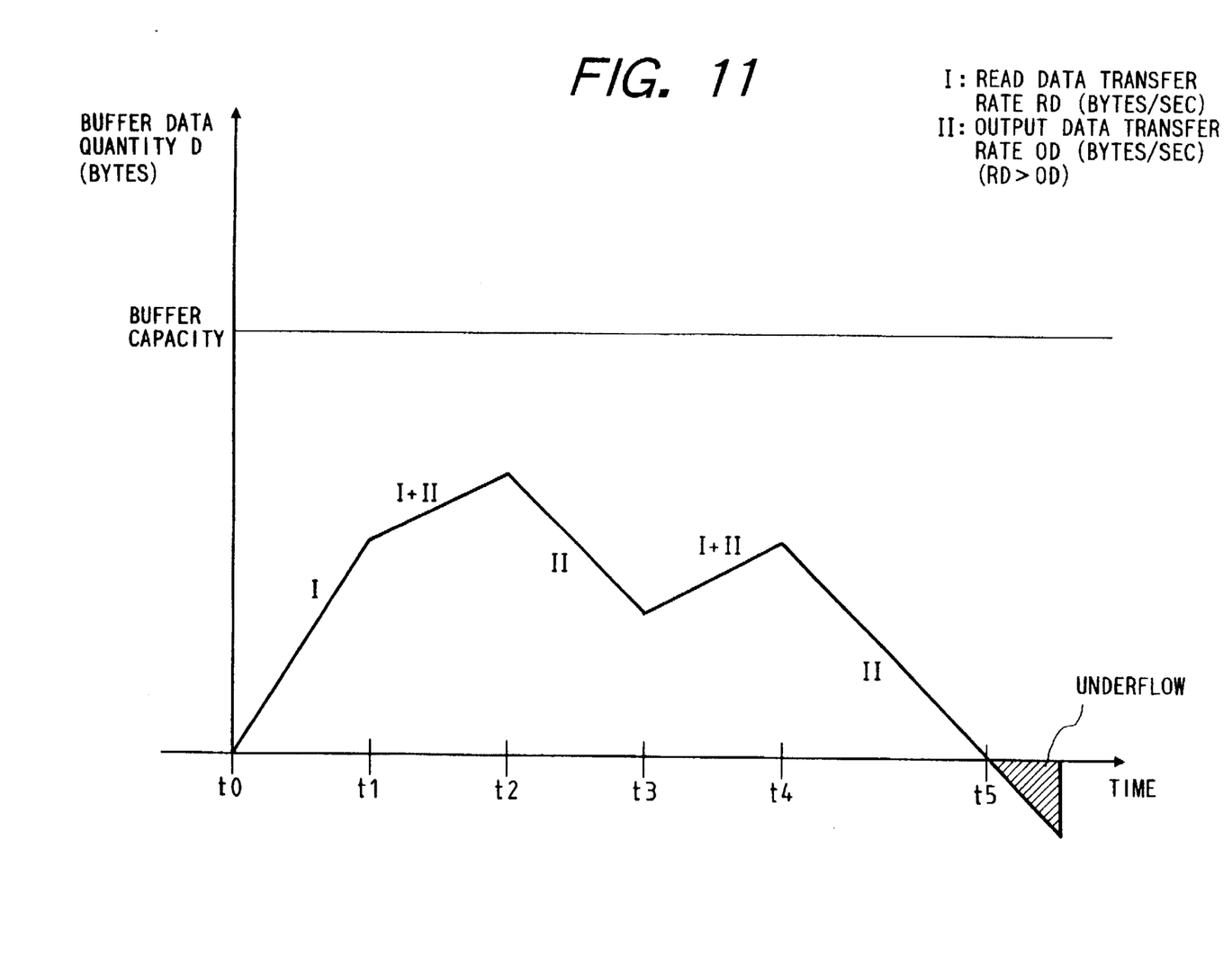
FIG. 11 is a graph showing exemplary time-variations in the buffer data quantity in reproducing operation.

FIG. 11 shows time-variations in the buffer data quantity D in reproducing operation. Though data transfer from the buffer 102 to the output IF 104 is carried out at a constant rate after a start time t0, data transfer from the recorder/reproducer 103 to the buffer 102 is interrupted by every seek. In period of t0 through t1, data transfer is carried out only from the recorder/reproducer 103 to the buffer 102, causing the buffer data quantity D to increase. In periods of t1 through t2 and t3 through t4, both of a data output and a data read are concurrently carried out, causing the buffer data quantity to increase because a read data transfer rate RD is higher than an output data transfer rate OD. In periods of t2 through t3 and subsequent to t4, only an data output is carried out with a data read interrupted by a seek occurred in the disk recording media, resulting in a decrease in the buffer data quantity D. In the example of FIG. 11, the buffer 102 begins underflowing at time t5.

Returning to FIG. 10, if an underflow is expected during a period of reproducing of the data set in step 503, then the CPU 20 determines in step 505 that the data reproduction is impossible, and proceeds to step 405 in FIG. 9. Otherwise, the CPU 20 determines in step 504 that reproducing of the data set is possible, and proceeds to step 406 in FIG. 9.

If the data reproduction is impossible in step 404, then the CPU 20 changes or lowers the output data rate OD in step 405, and returns to step 404 to determine the reproduction possibility again.

If the data reproduction is possible in step 404, then the CPU 20 performs a test in step 406 to see if a data read from the recorder/reproducer 103 (i.e., the disc recording media) to the buffer 102 is possible. If not, the control is returned to step 406. If a data read is possible in step 406, the control is passed to step 407, where data is read from the recorder/reproducer 103 to the buffer 102.

Figures 12, 13:
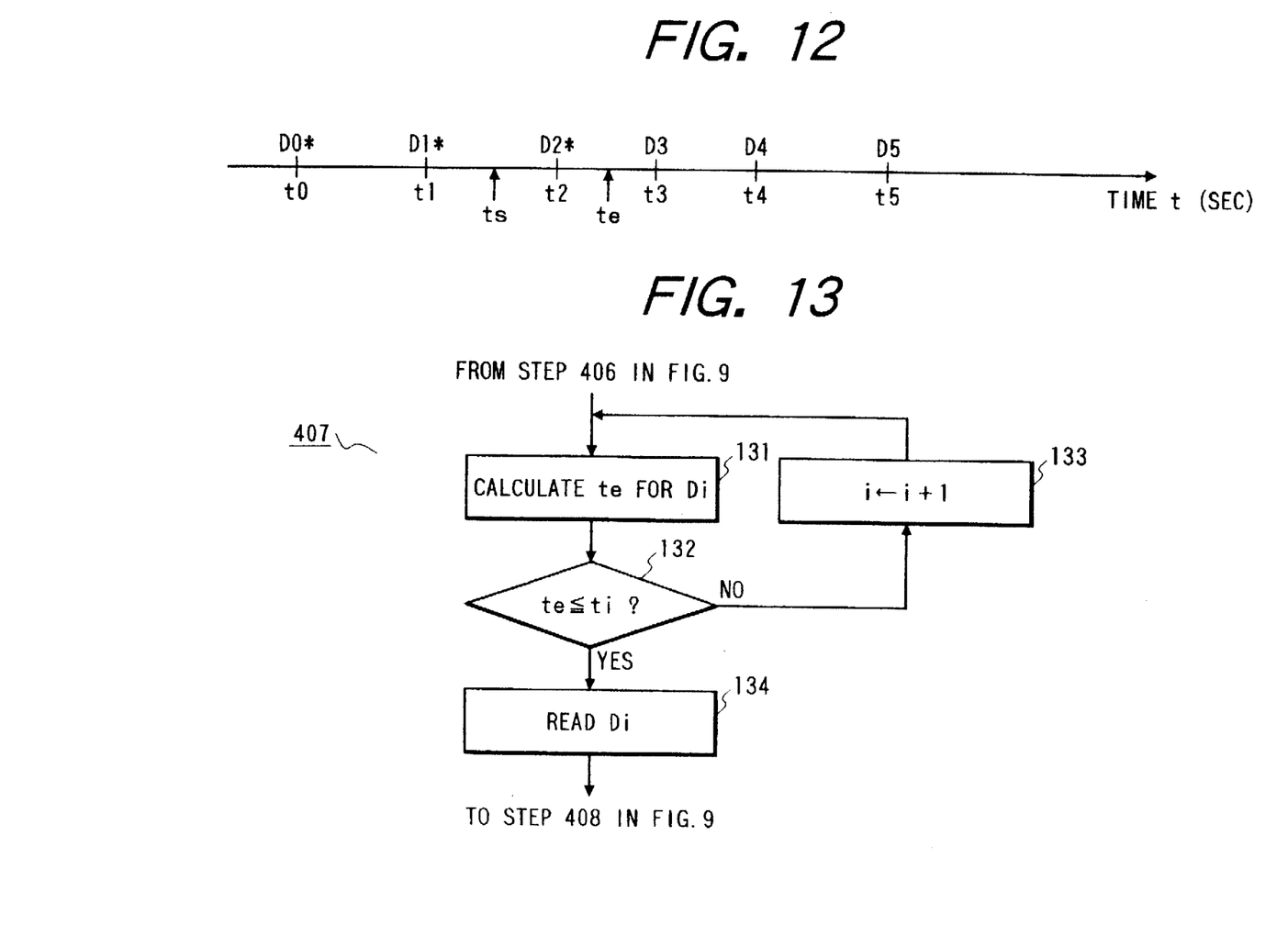
FIG. 12 is a diagram showing how data is read from the disk recording media to the buffer according to the principles of the invention.
FIG. 13 is a flow chart showing the details of step 407 of FIG. 9.

FIG. 12 is a diagram showing how data is read from the disk recording media to the buffer according to the principles of the invention. In FIG. 12, each time t0, t1, t2, t3, t4, t5 is a time by which a corresponding segment D0, D1, D2, D3, D4, D5 of data has to have been read into the buffer 102. The data segment D0, D1 and D2 have been already read into the buffer in this example.

FIG. 13 shows details of step 407 of FIG. 9. In FIG. 13, it is assumed that data segment D(i−1) has been read into the buffer 102 and data segment to be read next is Di, where i=0, 1, 2 ... Then, in step 131, the CPU 20 calculates the time $t_e$ to complete a read of data segment Di (D3 in this example) into the buffer 102 by using a read data transfer rate RD and a seek time associated with the track where the sector in which Di is recorded exists with reference to the data set table of FIG. 8 and the access data table of FIG. 6. In decision step 132, the CPU 20 determines if the read of Di will have been completed by the time ti (t3 in this example), that is, $t_e \leq ti$. If it is determined that the read of Di can not be completed by ti, then the control is passed to step 133, where the read of Di is given up and next data segment D(i+1) is considered, that is, i is incremented, and the control is returned to step 131. If it is determined in step 132 that the read of Di can be completed by ti, then the data segment Di is read from the disk recording media to the buffer 102 in step 134, and the control is passed to step 408 in FIG. 9.

In step 408, the CPU 20 performs a test to see if the whole of the data set in the disk recording media have been transferred to the buffer 102. if not, then the control is returned to step 406. If the whole of the data set has been transferred in step 408, another test is made in step 409 to see if the whole of the data set in the buffer 102 has been transferred to the output IF 104. If not, then the step 409 is repeated. If the result is YES in step 409, then the CPU 20 ends operation in step 410.

In the flow of reproducing procedures, either a group of steps 402, 404 and 405 or a group of steps 131 through 134 is dispensable.

Many widely different embodiments of the present invention may be constructed without departing from the spirit and scope of the present invention. It should be understood that the present invention is not limited to the specific embodiments described in the specification, except as defined in the appended claims.

What is claimed is:

1. In an apparatus for recording and reproducing a time-series digital data set to and from a disk recording media via a buffer, a method for preventing a data loss caused by each of seek operations in a series of accesses, concerning the data set, to the disk recording media, the method comprising the steps of:

determining, prior to said series of accesses, whether the amount of data in said buffer will remain within the capacity of said buffer throughout the period of said series of accesses; and in the event said determining results in a negative result, changing a rate of data transfer with the outside prior to said series of accesses and again executing said determining step.

2. A method as defined in claim 1, wherein said series of accesses constitutes a write of said data set to said disk recording media, and wherein said determining step comprises the steps of:

selecting, in response to the occupancy of the sectors on said disk recording media, sectors to record said data set in during the period of said write of said data set;

calculating said amount of data in said buffer for each time of changes in the mode of access to said buffer during the period of said write by using an input data transfer rate, a write data transfer rate of a track where each of said selected sectors lies, and a seek time for each of changes in tracks to write in; and determining whether said amount of data in said buffer for each time of said changes in said mode falls within said capacity of said buffer.

3. A method as defined in claim 2, further comprising the steps, executed prior to said step of changing a rate of data transfer, of:

in the event said determining results in a negative result, determining whether there is at least a substitute for a sector which will cause said event; and in the event there is said at least a substitute, changing said sector for one of said at least a substitute, and returning to said step of calculating said amount of data in said buffer.

4. A method as defined in claim 3, further comprising the step of:

in the event there is no substitute for said sector, executing said step of changing said rate of data transfer.

5. A method as defined in claim 2, wherein said step of changing said rate of data transfer comprises the step of reducing a rate of input data transfer to said buffer.

6. A method as defined in claim 2, wherein said step of selecting said sectors to record said data set in further comprises the step of:

in the course of said selecting step, forming a table of track numbers and sector numbers in which said data set is stored.

7. A method as defined in claim 1, wherein said series of accesses constitutes a read of said data set from said disk recording media, and wherein said determining step comprises the steps of:

calculating said amount of data in said buffer for each time of changes in the mode of access to said buffer during the period of said read by using an output data transfer rate, a read data transfer rate of a track where each of sectors storing said data set lies, and a seek time for each of changes in tracks to write in; and determining whether said amount of data in said buffer for each time of said changes in said mode falls within said capacity of said buffer.

8. A method as defined in claim 7, wherein said step of changing said rate of data transfer comprises the step of reducing a rate of output data transfer from said buffer.

9. A method as defined in claim 7, further comprising the steps of:

in response to a determination that a preprocessing is unnecessary, omitting all of said steps;

in the course of said read, making a decision on whether a read operation of the next data to read can be completed before a reproduction of said next data is started; and in response to a negative result of said decision, giving up said read operation, assuming that said next data to read is the data to read following the given-up read operation, and returning to said step of making a decision.

10. A digital recording and reproducing apparatus which prevents a data loss caused by each of seek operations in a series of accesses, concerning a time-series digital data set, to the disk recording media, the apparatus comprising:

a recorder/reproducer for writing and reading said data set to and from a disk recording media;

a buffer for absorbing the difference between a data input rate and a data writing rate and the difference between a data reading rate and a data output rate; and a controller for providing a control for each of the above and other elements, wherein said controller comprises:

means for determining, prior to said series of accesses, whether the amount of data in said buffer will remain within the capacity of said buffer throughout the period of said series of accesses; and means operative in case when said determining results in a negative result, changing a rate of data transfer with the outside prior to said series of accesses and passing the control to said determining means.

11. An apparatus as defined in claim 10, wherein said series of accesses constitute a write of said data set to said disk recording media, and wherein said determining means comprises:

means responsive to the occupancy of the sectors on said disk recording media for selecting sectors to record said data set in during the period of said write of said data set;

means for calculating said amount of data in said buffer for each time of changes in the mode of access to said buffer during the period of said write by using an input data transfer rate, a write data transfer rate of a track where each of said selected sectors lies, and a seek time for each of changes in tracks to write in; and determining whether said amount of data in said buffer for each time of said changes in said mode falls within said capacity of said buffer.

12. An apparatus as defined in claim 11, wherein said controller further comprises:

means, which is operative if said determining results in a negative result and said control is passed to prior to said means for changing said rate of data transfer, for determining whether there is at least a substitute for a sector which will cause said negative result; and means, which is operative if there is said at least a substitute and which said control is passed to prior to said means for changing said rate of data transfer, for changing said sector for one of said at least a substitute, and passing said control to said means for calculating said amount of data in said buffer.

13. An apparatus as defined in claim 12, wherein said controller further comprises:

means operative in case when there is no substitute for said sector for passing said control to said means for changing said rate of data transfer.

14. An apparatus as defined in claim 11, wherein said means for changing said rate of data transfer comprises:

means for reducing a rate of input data transfer to said buffer.

15. An apparatus as defined in claim 11, wherein said means for selecting said sectors to record said data set in further comprises:

means for forming, in the course of said selecting said sectors, a table of track numbers and sector numbers in which said data set is stored.

16. An apparatus as defined in claim 10, wherein said series of accesses constitute a read of said data set from said disk recording media, and wherein said determining means comprises:

means for calculating said amount of data in said buffer for each time of changes in the mode of access to said buffer during the period of said read by using an output data transfer rate, a read data transfer rate of a track where each of sectors storing said data set lies, and a seek time for each of changes in tracks to write in; and means for determining whether said amount of data in said buffer for each time of said changes in said mode falls within said capacity of said buffer.

17. An apparatus as defined in claim 16, wherein said means for changing said rate of data transfer comprises:

means for reducing a rate of output data transfer from said buffer.

18. An apparatus as defined in claim 16, wherein said controller further comprises:

means responsive to a determination that a preprocessing is unnecessary for omitting passing said control to any of said means;

means for making a decision, in the course of said read, concerning whether a read operation of the next data to read can be completed before a reproduction of said next data is started; and means responsive to a negative result of said decision for giving up said read operation, assuming that said next data to read is the data to read following the given-up read operation, and returning to said means for making a decision.

* * * * *